United States Patent [19]
Hotta et al.

[11] Patent Number: 5,920,844
[45] Date of Patent: Jul. 6, 1999

[54] INFORMATION DISPLAY METHOD

[75] Inventors: Yoshihiko Hotta, Mishima; Masaki Yoshino, Yokohama; Makoto Mori, Tokyo; Kazumi Suzuki, Shizuoka-ken; Akira Suzuki, Mishima, all of Japan

[73] Assignee: Ricoh Company, Ltd., Tokyo, Japan

[21] Appl. No.: 08/648,446

[22] Filed: May 15, 1996

[30] Foreign Application Priority Data

May 15, 1995 [JP] Japan ................................ 7-138853
May 15, 1996 [JP] Japan ................................ 8-143439

[51] Int. Cl.$^6$ .................................................. G06K 19/00
[52] U.S. Cl. ........................................... 705/1; 235/380
[58] Field of Search ........................... 503/201; 705/1; 235/379, 380, 381, 384, 375

[56] References Cited

U.S. PATENT DOCUMENTS

| | | | |
|---|---|---|---|
| 4,917,948 | 4/1990 | Hotta | 428/335 |
| 5,274,218 | 12/1993 | Urata et al. | 235/449 |
| 5,321,239 | 6/1994 | Masubuchi et al. | 235/380 |
| 5,448,284 | 9/1995 | Masubuchi et al. | 347/221 |
| 5,471,044 | 11/1995 | Hotta et al. | 235/487 |

*Primary Examiner*—Kevin J. Teska
*Assistant Examiner*—Matthew Loppnow
*Attorney, Agent, or Firm*—Oblon, Spivak, McClelland, Maier & Neustadt, P.C.

[57] ABSTRACT

An information display method by use of a card including an information display section which includes a reversible thermosensitive recording portion capable of recording information reversibly therein with application of heat thereto, comprises the steps of (1) storing first information in the information display section; (2) comparing the first information stored in the information display section with a reference information; (3) displaying a second information in the information display section, based on the comparison of the first information and said reference information, and repeating the steps (1) to (3) by updating the first information and the second information when further information is stored in the information display section.

9 Claims, 5 Drawing Sheets

| RAM | SHOP CODE | NUMBER OF DOUBLE HAMBURGERS | 239g |
| | | NUMBER OF HAMBURGERS | |
| | SHOP CODE | NUMBER OF DOUBLE HAMBURGERS | 239f |
| | | NUMBER OF HAMBURGERS | |
| | SHOP CODE | NUMBER OF DOUBLE HAMBURGERS | 239e |
| | | NUMBER OF HAMBURGERS | |
| | TOTAL NUMBER OF DOUBLE HAMBURGERS | | 239d |
| | TOTAL NUMBER OF HAMBURGERS | | 239c |
| | MEMBERSHIP DATA | | 239b |
| | CARD NO. | | 239a |

INFORMATION DISPLAY METHOD

BACKGROUND OF THE INVENTION

1. Field of the Invention

The present invention relates to an information display method by use of a card, which may be used, for example, as service card for shopping, which comprises an information display section comprising a reversible thermosensitive recording portion capable of recording information reversibly therein with application of heat thereto, in which information display section, first information can be stored successively and additionally, and second information indicating, for example, a valuable point value or premium to be gained by a customer, which is obtained, based on the first information and a reference information, can also be stored and displayed.

2. Discussion of Background

In most shops providing premium point service to customers, so-called customer's cards or members' cards are conventionally used. Such conventional members' cards mostly show very simple stamped information.

Telephone cards, prepaid cards for transportation, credit cards, cash cards for banks, and ID cards, which are now in general use, mostly record digital information for mechanical processing, and therefore do not have function of displaying recorded information in visible form. Therefore, there are many cases where hard copies which displays information recorded in such cards have to be made.

However, there are few that can provide recorded digital information in visible image in real time.

In an attempt to meet this requirement, there have been proposed IC cards with a built-in liquid display device using a thin battery so as to have a display function. These IC cards have such multiple functions that can be used as a calculator an well. However, they are costly due to the necessity for batteries and not always handy.

Japanese Laid-Open Patent Applications 4-242683 and 6-71039 disclose so-called point cards each comprising a stripe-shaped magnetic recording layer coated on the back side of the card. Furthermore, there is provided a visible image display portion on the front side of the stripe-shaped magnetic recording layer. In the visible image display portion, iron powder is sealed with a transparent sealing cover plate, and when the stripe-shaped magnetic recording layer in imagewise magnetized, the iron powder is correspondingly attracted imagewise to the imagewise magnetized portions of the stripe-shaped magnetic recording layer, whereby visible images made of the iron powder are formed by the magnetic powder. However, the thus formed magnetic power images are not suitable for use in practice.

There has not been available an the market a service card which in capable of reversibly recording information and displaying recorded information in visible form in real time and can be used in practice for an extended period of time.

SUMMARY OF THE INVENTION

It is therefore an object of the present invention to provide an information display method which is capable of reversibly, rewritably recording information and displaying recorded information in visible form in real time by use of a card.

This object of the present invention can be achieved by an information display method using a card comprising an information display section which comprises a reversible thermosensitive recording portion capable of recording information reversibly therein with application of heat thereto, comprising the steps of:

(1) storing first information in the information display section;

(2) comparing the first information stored in the information display section with a reference information;

(3) displaying a second information in the information display section, obtained by a comparative process based on the comparison of the first information and the reference information, and repeating the steps (1) to (3) by updating the first information and the second information when further information is stored in the information display section.

In the above information display method, the first information may comprise a plurality of pieces of information, and the plurality of pieces of information can be successively and additionally stored in the information display section.

Furthermore, the first information may be displayed in accordance with the storing thereof in the information display section.

The information display method may further comprise the stop of making choice as to whether or not the repeating of the steps (1) to (3) should be performed.

The object of the present invention can also be achieved by an information display method using a card comprising an information display section which comprises a reversible thermosensitive recording portion capable of recording information reversibly therein with application of heat thereto, and an information memory section capable of storing information therein, comprising the stops of:

(1) storing first information in both the information display section and the information memory section;

(2) comparing the first information stored in the information memory section with a reference information;

(3) displaying a second information in the information display section, and storing the same second information in the information memory section, whichever step may come first, obtained by a comparative process based on the comparison of the first information and the reference information; and repeating the steps (1) to (3) by updating the first information and the second information when further information is stored in the information display section.

In the above-mentioned information display method, the first information may comprise a plurality of pieces of information, and the plurality of pieces of information can be successively stored in both the information display section and the information memory section.

Furthermore, the first information may be displayed in accordance with the storing thereof in the information display section.

The information display method may further comprise the stop of making choice as to whether or not the repeating of the steps (1) to (3) should be performed.

In the above-mentioned information recording method, the information memory section may comprise at least one memory section selected from the group consisting of a magnetic memory section, an IC memory section, and a rewritable bar code section.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In an information display method of the present invention, there is used a card comprising an information display section which comprises a reversible thermosensitive recording portion capable of recording information reversibly therein with application of heat thereto.

The image display method of the present invention comprises the steps of:

(1) storing first information in the information display section;

(2) comparing the first information stored in the information display section with a reference information;

(3) displaying a second information in the information display section, obtained by a comparative process based on the comparison of the first information and the reference information, and repeating the steps (1) to (3) by updating the first information and the second information when further information in stored in the information display section.

In the above information display method, the first information may comprise a plurality of pieces of information, such as icons showing representative goods in each shop, for example, an icon showing a hamburger at a hamburger shop, and an icon showing a beer mug at a beer shop.

The plurality of pieces of such information can be successively stored in the information display section, for instance, by heating moans such a thermal printer capable of forming such icon images in the information display section.

In this example, the information display section serves not only as an information display section, but also as an information memory section.

Therefore, the first information may be accumulated in the information display section, for example, at each shopping, and such accumulated information can be displayed as it is accumulated and stored in the image display section.

The thus accumulated information is then compared with a reference information which is stored in advance, for instance, in memory means such as ROM, which is built in the previously mentioned printer, or in independent memory means as a personal computer connected to the above-mentioned printer, or in an independent computer through a network which is connected to the printer.

The reference information may comprise a plurality of pieces of information, by which, for instance, a specific premium to be served to the customer may be selected.

By a comparative process based on the comparison of the first information and the reference information, a second information is displayed in the information display section, which specifically displays, for example, the customer's gained valuable values or information corresponding to a gained valuable matter, such as the total number of gained hamburger icons.

Such second information may also be specified, for instance, by a virtual roulette which provides a number or a specific item by which a valuable value or valuable matter such as point or premium to be gained is automatically determined. Such a virtual roulette may also be built in the previously mentioned printer.

The second information is displayed in the information display section, for instance, by the printer.

The customer can select one of two choices, that is, receiving the premium that moment, or accumulating the valuable value by taking look at the displayed second information for later use.

When the customer decides to accumulate the valuable value and store further information in the information display section, the above-mentioned steps (1) to (3) are repeated by updating the first information and the second information.

The above-mentioned printer for use in the present invention comprises at least image formation means for forming images in the information display section of the card, and image erasing means for erasing the formed images.

More specifically, examples of the image formation means include thermal head and laser; and examples of the image erasing means include thermal head, hot stamp, ceramic heater, and heat roller.

For instance, one thermal head can be used not only as the image formation means, but also as the image erasing means.

When a card without an additional information memory section is used, optical means for reading images, such as OCR, is also necessary in addition to the above-mentioned image formation means and image erasing means.

When a card provided with an additional information memory section in used, means for reading information and rewriting information for use in the information memory section is also necessary in addition to the image formation means and image erasing means. For example, when the information memory section comprises a magnetic recording portion, a magnetic head is necessary; while when the information memory section comprises a bar code portion, a bar code scanner is necessary.

The object of the present invention can also be achieved by an information display method using use of a card comprising an information display section which comprises a reversible thermopensitive recording portion capable of recording information reversibly therein with application of heat thereto, and the above-mentioned information memory section for storing information.

This image display method of the present invention comprises the steps of:

(1) storing first information in both the information display section and the information memory section;

(2) comparing the first information stored in the information memory section with a reference information;

(3) displaying a second information in the information display section, and storing the second information in the information memory section, whichever step may come first, obtained by a comparative process based on the comparison of the first information and the reference information; and repeating the steps (1) to (3) by updating the first information and the second information when further information is stored in the information display section.

In the above-mentioned information display method, the first information may comprise a plurality of pieces of information, and the plurality of pieces of information can be successively stored in both the information display section and the information memory section.

Furthermore, the first information may be displayed in accordance with the storing thereof in the information display section.

The information display method may further comprise the stop of making choice as to whether or not the repeating of the steps (1) to (3) should be performed.

In the above-mentioned information recording method, the information memory section may comprise at least one memory section selected from the group consisting of a magnetic memory section, an IC memory section, and a rewritable bar code section.

As the material for the reversible thermosensitive recording portion of the card for use in the present invention, any materials can be used so long as the transparency or color tone thereof can be reversibly changed by the application of heat thereto.

It is preferable that the materials for the reversible thermosensitive recording portion be capable of assuming two different states with respect to the color tone and/or transparency thereof at room temperature without the application of heat thereto.

Specific examples of such materials are a material comprising a mixture of two or more kinds of polymer components, which can reversibly assume a transparent state or a milky white state, depending upon the difference in the compatible state of the polymer components in the mixture, as disclosed in disclosed in Japanese Laid-Open Patent Application 61-258853, liquid crystal polymers with the changes in the phase thereof being utilized as disclosed on page 2, right upper column, line 3 to page 4, left upper column, line 17, of Japanese Laid-Open Patent Application 62-66990, and materials which assume a first colored state at a first specific temperature which is above room temperature, and which assume a second colored state when heated to a second specific temperature which is above the first specific temperature and then cooled.

Of the above examples, there are preferably employed the materials which can assume two different colored states at a first specific temperature and a second specific temperature.

Specific examples of these materials include a material which assumes a transparent state at a first specific temperature and a milky white state at a second specific temperature (Japanese Laid-Open Patent Application 55-154198), a material which assumes a colored state at a first specific temperature, and a decolorized state at a second specific temperature (Japanese Laid-Open Patent Application 4-247985), a material which assumes a milky white state at a first specific temperature and a transparent state at a second specific temperature (Japanese Laid-Open Patent Application 3-169590), and materials which are colored, for instance, black, red, or blue, at a first specific temperature, and decolorized at a second specific temperature (Japanese Laid-Open Patent Applications 2-188293 and 2-188294).

Of the above-mentioned kinds of materials, a material comprising a resin and an organic low-molecular material which is dispersed in the resin, assumes a transparent state at a first specific temperature, and a milky white state at a second specific temperature is most preferably employed because of excellent thermal recording sensitivity and durability. In particular, materials comprising leuco dyes, which can assume a black, red, or blue color, are preferable in view of the contrast of images produced by such materials.

The following are methods for improving such reversible thermosensitive recording materials:

In order to expand the range in which the reversible thermosensitive recording material is in a transparent state at a first specific temperature, two or more different kinds of organic low-molecular weight compounds are appropriately combined or such an organic low-molecular weight compound is used in combination with another material having a different melting point from that of the organic low-molecular weight compound. Reversible thermosensitive recording materials of this kind are disclosed, for instance, in Japanese Laid-Open Patent Applications 63-39378, 63-130380, 1-123798, 2-1363, and 3-2089, but are not limited to those reversible thermosensitive recording materials In order to facilitate the formation of transparent images, additives such as surfactants and plasticizers can be added to the reversible thermosensitive recording materials. Such additives are disclosed, for instance, in Japanese Laid-Open Patent Applications 63-104879, and 63-178079, but are not limited to those disclosed in the Japanese Laid-Open Patent Applications.

A reversible thermosensitive recording portion may be cross-linked by the application of heat, UV, or EB (electron beam), whereby the durability of the reversible thermosensitive recording portion while in use can be improved. For such improvement, the cross-linking by the application of EB is preferable.

A protective layer may be provided on the reversible thermosensitive recording portion to protect the reversible thermosensitive recording portion.

As the materials for such a protective layer with a thickness of 0.1 to 5 $\mu$m, there can be employed silicone rubber, silicone resin (as disclosed in Japanese Laid-Open Patent Application 63-221087), polysiloxane graft polymer (as disclosed in Japanese Laid-Open Patent Application 63-317385), and ultraviolet curing resin and electron beam curing resin (as disclosed in Japanese Laid-Open Patent Application 4-85077). Furthermore, for instance, organic or inorganic materials (as disclosed in Japanese Laid-Open Application 4-85077) or silicone oil may be contained in the protective layer. In any case, a solvent is used for providing the protective layer by coating. It is preferable that such a solvent be a solvent in which the resin used in the reversible thermosensitive recording portion and the low-molecular weight compounds as mentioned above be insoluble or hardly soluble.

7

Furthermore, in order to improve the contrast of images formed, a reflection layer formed, for instance, by deposition of a metal such as Al may be provided on the reversible thermosensitive recording portion as disclosed in Japanese Laid-Open Patent Applications 1-14079, and 1-20193.

Other features of this invention will become apparent in the course of the following description of exemplary embodiments, which are given for illustration of the invention and are not intended to be limiting thereof.

REFERENCE EXAMPLE 1

Figure 1:
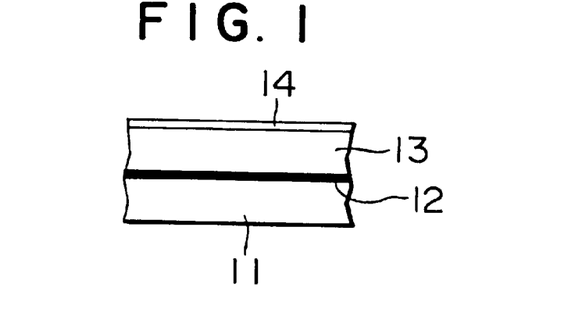
FIG. 1 is a schematic cross-sectional view of an example of an information display section of a card for use in the present invention.

As illustrated in FIG. 1, an aluminum reflection layer 12, a reversible thermosensitive recording layer 13 and a protective layer 14 were successively overlaid on a support member 11, whereby a reversible thermosensitive recording film No. 1 was prepared.

Figure 2:
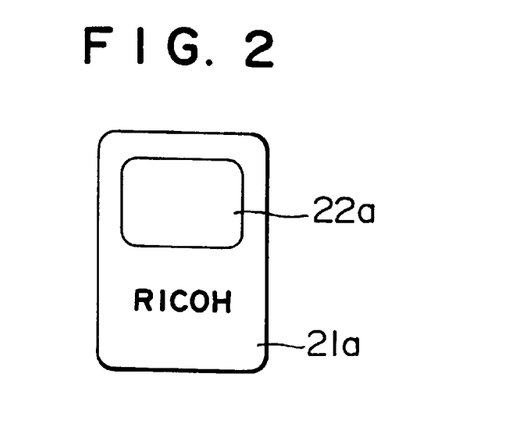
FIG. 2 is a schematic plan view of an example of a card for use in the present invention.

The thus prepared thermosensitive recording film No. 1 was worked into an information display section 22a as shown in FIG. 2 in which information is rewritable and can displayed.

The information display section 22a is then mounted on a support, whereby a card 21a for use in the present invention was fabricated an illustrated in FIG. 2.

Any printing can be performed as desired in the area other than the information display section 22a on the support.

The information display section 22a can be mounted in any place on the support.

REFERENCE EXAMPLE 2

Figure 10:
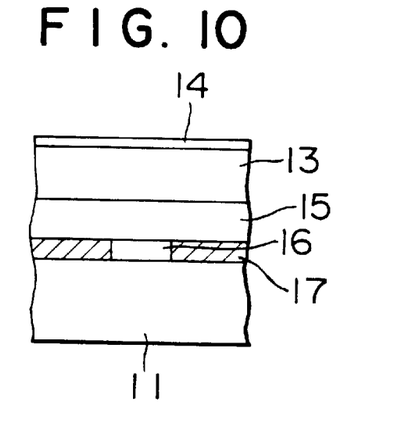
FIG. 10 is a schematic cross-sectional view of part of another example of an information display section of a card for use in the present invention.

With reference to FIG. 10, a reversible thermosensitive recording layer 13 and a protective layer 14 were successively overlaid on a transparent PET film 15 to prepare a composite film.

The thus prepared composite film was then applied on a support member 11 through an adhesive layer 17 including an air layer 16 serving as a layer with low refractive index, whereby a reversible thermosensitive recording film No. 2 was prepared.

The thus prepared thermosensitive recording film No. 2 was worked into an information display section 22b (not shown) corresponding to the information display section 22a in FIG. 1 and mounted on a support, whereby a card 21b (not shown) for use in the present invention was fabricated in the same manner as illustrated in FIG. 2.

REFERENCE EXAMPLE 3

Figure 11:
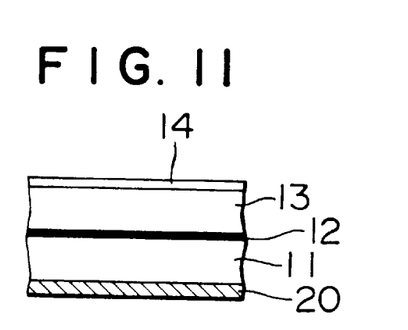
FIG. 11 is a schematic cross-sectional view of part of a further example of an information display section of a card for use in the present invention.

As illustrated in FIG. 11, an aluminum reflection layer 12, a reversible thermosensitive recording layer 13 and a protective layer 14 were successively overlaid on a support member 11.

On the back side of the support member 11, opposite to the aluminum reflection layer 12 with respect to the support member 11, a magnetic recording layer 20 was provided, whereby a reversible thermosensitive recording material was prepared.

The thus prepared reversible thermosensitive recording material was worked into an information display section 22c (not shown) corresponding to the information display section 22a shown in FIG. 1.

A card 22c including the above information display section 22c (not shown) used in the present invention was fabricated.

In the magnetic recording layer 20, various data for security, such an card number, card issue data, membership data, and premium data, are recorded to avoid unfair use of the card.

8

EXAMPLE 1

Figure 3:
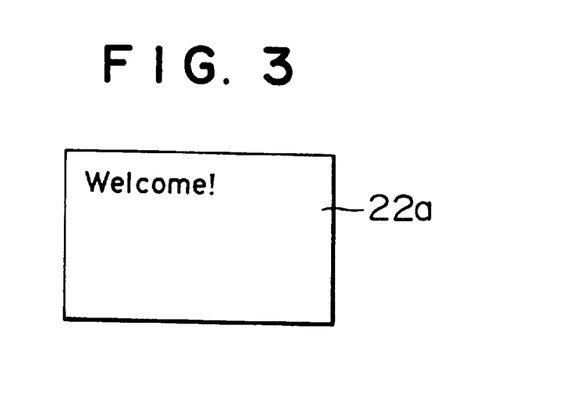
FIG. 3 is a schematic plan view of an information display section of a card for use in the present invention, immediately after it is issued.

For instance, card 21a as shown in FIG. 2 is issued to a customer when he or she shops, with the phrase "Welcome!" being displayed in the information display section 22a as illustrated in FIG. 3.

In the information display section 22a, the customer's name, shopping date and other information can be displayed by a thermal printer (not shown).

After shopping with payment, information about the shopping is added to the card. For instance, for the customer who has made shopping in an amount of 500 to 1000 yen, one hamburger icon is added and displayed in the information display section 22a; and for the customer who has made shopping in an amount of more than 1000 yen to 1500 yen, two hamburger icons are added and displayed in the information display section 22a by the printer, based on the comparison of the shopping information that day and a reference information stored in the printer.

Figure 4:
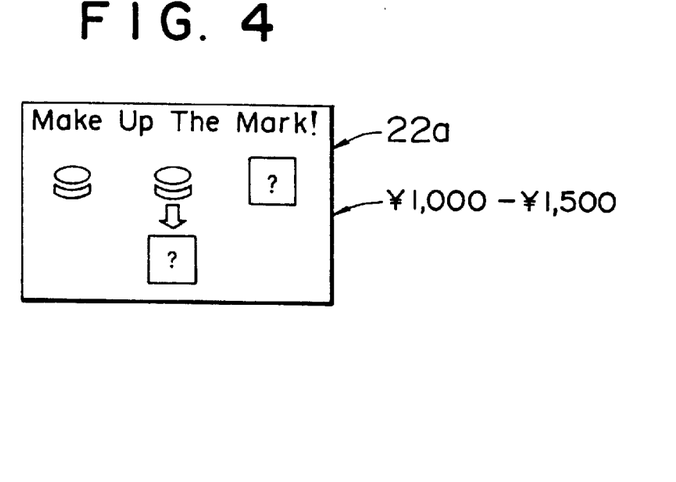
FIG. 4 is a schematic plan view of an information display section of a card for use in the present invention, in the course of a plurality of pieces of information being successively displayed.

This can be automatically performed by a roulette unit which is built in the printer and displayed, for instance, as illustrated in FIG. 4 when the shopping amount is, for instance, between more than 1000 to 1500 yen.

Figure 5:
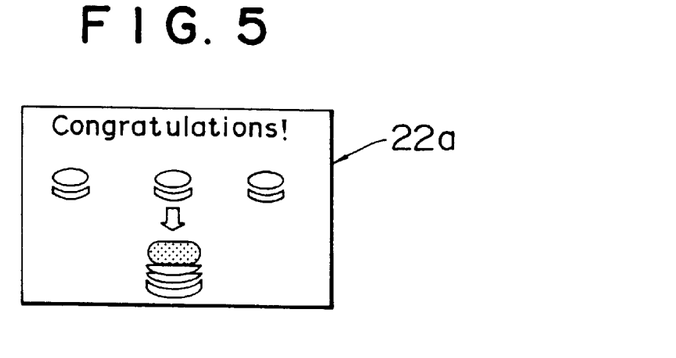
FIG. 5 is a schematic plan view of an information display section of a card for use in the present invention, displaying the results of the addition of a plurality of pieces of information.
Figure 6:
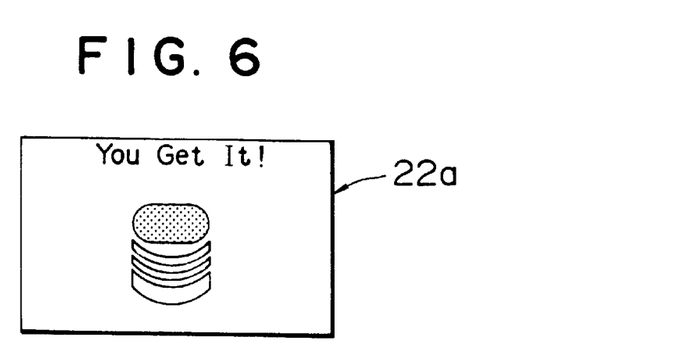
FIGS. 6–9 are respectively a schematic plan view of an information display section of a card for use in the present invention, displaying further results of the addition of a plurality of pieces of information.

In the next shopping, depending upon the amount of the shopping, an icon is added or modified, for instance, as illustrated in FIG. 5, in which one hamburger icon is added, and the middle hamburger icon changes its ranking to a double hamburger icon. At this stage, the customer can obtain a premium corresponding to the double hamburger icon as illustrated in FIG. 6.

Figure 7:
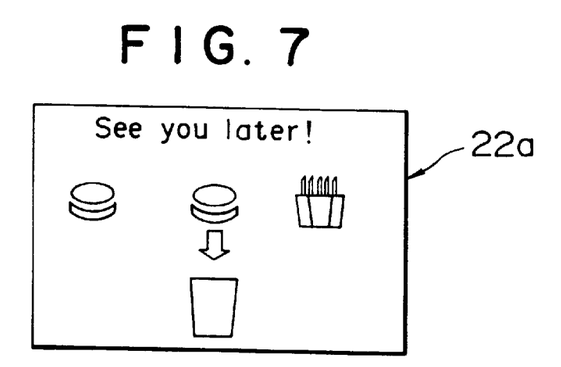

However, when the amount of shopping is not enough for changing the ranking of the icon to the double hamburger icon, another choice is displayed by an icon added for instance, as shown in FIG. 7.

Figure 8:
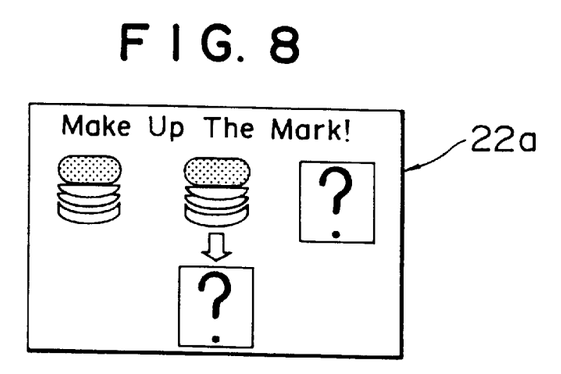

In case the customer does not receive the premium at the stage as shown in FIG. 7 and continues further shopping, the icons in the information display section 22a will be changed, for instance, as shown in FIG. 8.

Figure 9:
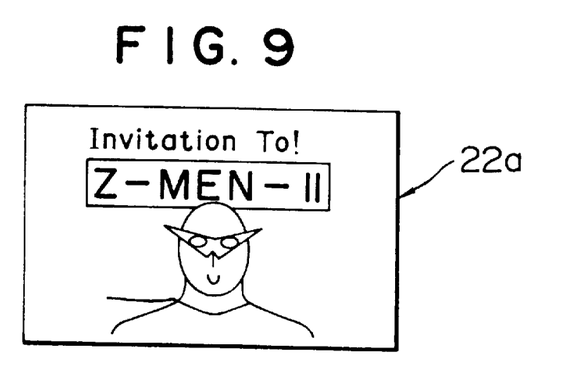

At the next shopping, the icons in the information display section 22a will be further changed, for instance, as shown in FIG. 9.

The above-mentioned icons are successively printed by the thermal printer in the information display section 22a.

The previously mentioned cards 22b and 22c can also be used in the same manner as in the above.

REFERENCE EXAMPLE 4

In the same manner as in Reference Example 1, an aluminum reflection layer 12, a reversible thermosensitive recording layer 13 and a protective layer 14 were successively overlaid on a support member 11, whereby a reversible thermosensitive recording film No. 1 was prepared.

Figure 12A:
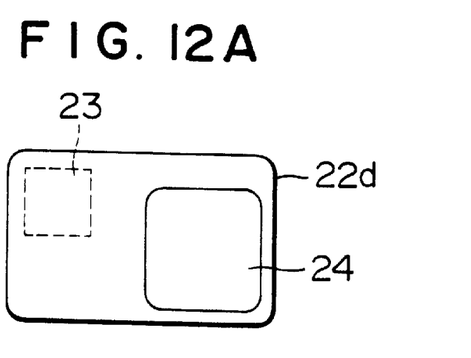
FIG. 12A is schematic plan view of a card for use in the present invention.

The thus prepared thermosensitive recording film No. 1 was worked into a label of an information display section 24 in which information is rewritable and can displayed as shown in FIG. 12A.

The label of the information display section 24 was applied to a support, and on the back side of the support, there was formed a vacant portion 23 for an IC chip to be built in, whereby a card 21d for use in the present invention was fabricated as illustrated in FIG. 12A.

Figure 12B:
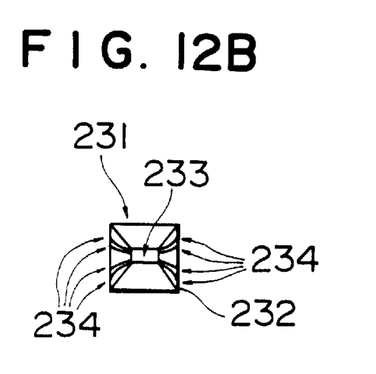
FIG. 12B is a schematic plan view of a wafer for use in the card shown in FIG. 12A.

In the vacant portion 23, there was fixed a wafer 231 as shown in FIG. 12B.

The wafer 231 is composed of a wafer substrate 232 and an IC (integrated circuit) 233 provided thereon. A plurality of contact terminals 234, which are electrically connected to the IC 233, are provided on the wafer substrate 232. The contact terminals 234 are exposed on the back side of the wafer substrate 232, and electrically connected to the previously mentioned printer, so that a predetermined data is read from the previously mentioned card or the read data is rewritten.

The functions of the card for use in the present invention will now be explained with reference to FIG. 13A.

Figure 13A:
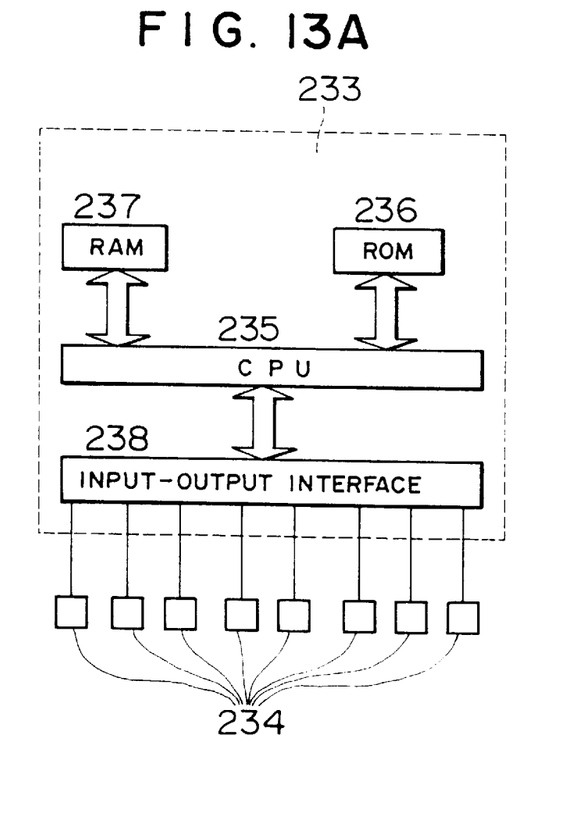
FIG. 13A is a block diagram of the functional outline of the IC 233.
Figure 13B:
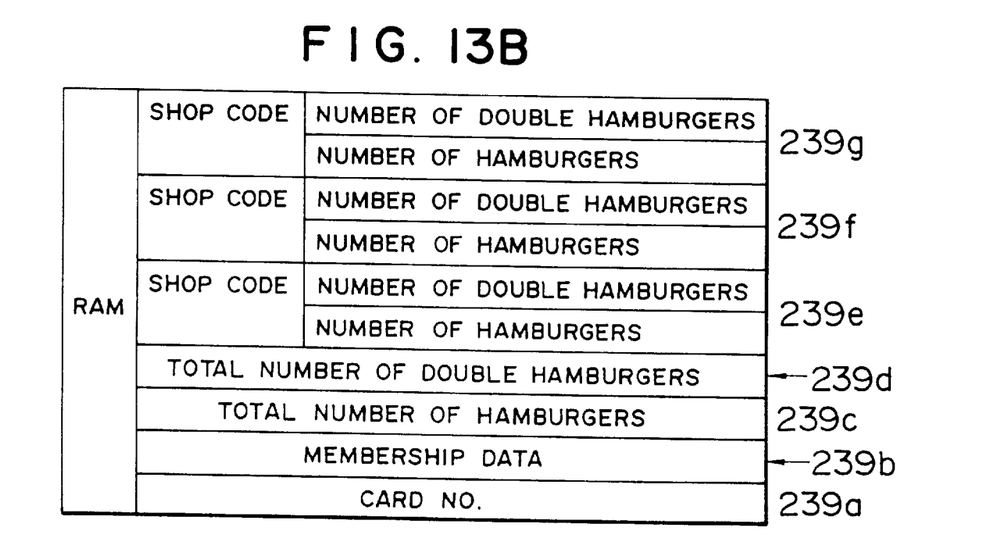
FIG. 13B is a block diagram of an example of RAM memory data for use in the card shown in FIG. 12A.

FIG. 13A is a block diagram of the outline of the IC 233 and FIG. 13B is a block diagram of an example of RAM memory data.

IC 233 is composed of, for example, LSI, and includes CPU 235 for performing control operations in a predetermined procedure, ROM 236 for storing the operation program data of CPU 235, and RAM 237 for writing and reading necessary date.

Furthermore, IC 233 includes an input-output interface 238 for supplying input data to CPU 235 upon receiving input signals, and for externally outputting data upon receiving output signals from CPU 235, a power-on-reset circuit, a clock generation circuit, a pulse dividing circuit (an offering pulse generation circuit), and an address decoder circuit (not shown).

CPU 235 makes it possible to perform the operation of an offering control routine in response to an offering pulse which is periodically fed from the pulse diving circuit.

Address decode circuit decodes the address data from CPU 235 and supplies signals to RON 236, RAM 237 and input-output interface 238, respectively.

A plurality of contact terminals 234 (8 contact terminals in FIG. 13A) are connected to input-output interface 238, so that predetermined data from the previously mentioned printer (card reader and writer) in input to CPU 235 through input-output interface 238 via the contact terminals 234.

CPU 235 performs each operation in response to the signals input thereto and also in accordance with the program data stored in ROM 236, and outputs predetermined data and signals to the card reader and writer through the input-output interface 238.

In the present invention, it is possible to incorporate a simple program for random number generation in ROM 236, whereby there can be generated at random varieties of signals corresponding to a plurality of valuable values, or signals corresponding to a valuable matter, which are caused to exist in accordance with combination of a plurality of pieces of information.

As illustrated in FIG. 13B, RAM 236 includes a plurality of memory areas 239a to 239f. For instance, card number is stored in area 239a; and ID data such as card's owner's name, address, and telephone number is stored in area 239b. In area 239c, for instance, there is stored gained valuable values or information corresponding to a gained valuable matter, such as the total number of gained hamburger icons; in area 239d, for instance, there is stored gained valuable values of higher rank or information corresponding to a gained valuable matter of higher rank, such as the total number of gained double hamburger icons In areas 239e, 239f and 239g, for example, there are separately stored the respective shop codes, gained valuable values of higher rank or information corresponding to a gained valuable matter of higher rank, the total number of gained double hamburger icons.

The information in the card employed here can be easily rewritten by a reader-writer. The reader-writer may also be connected to a virtual roulette which provides a number and a specific item by which a valuable value or valuable matter such as point or premium to be gained is automatically determined. The information in the card may also be altered in accordance with the information provided by the virtual roulette.

Japanese Patent Application No. 7-138653 filed May 15, 1995 is hereby incorporated by reference.

What is claimed is:

1. An information display method by use of a card comprising an information display section which comprises a reversible thermosensitive recording portion capable of recording information reversibly therein with application of heat thereto, comprising the steps of:

(1) storing first iconic information in said information display section;

(2) comparing said first iconic information stored in said information display section with reference information;

(3) displaying second iconic information in said information display section, based on the comparison of said first iconic information and said reference information, and repeating said steps (1) to (3) by updating said first iconic information and said second iconic information if further information is stored in said information display section.

2. The information display method as claimed in claim 1, wherein said first iconic information comprises a plurality of pieces of iconic information, which are successively stored in said information display section.

3. The information display method as claimed in claim 1, wherein said first iconic information is displayed in accordance with the storing thereof in said information display section.

4. The information display method as claimed in claim 1, further comprising the step of making a choice as to whether or not repeating of said steps (1) to (3) should be performed.

5. An information display method by use of a card comprising an information display section which comprises a reversible thermosensitive recording portion capable of recording information reversibly therein with application of heat thereto, and an information memory section for storing information, comprising the steps of:

(1) storing first iconic information in both said information display section and said information memory section;

(2) comparing said first iconic information stored in said information memory section with reference information;

(3) displaying second iconic information in said information display section, and storing said second iconic information in said information memory section, whichever step may come first, based on the comparison of said first iconic information and said reference information; and repeating said steps (1) to (3) by updating said first iconic information and said second iconic information if further information is stored in said information display section.

6. The information display method as claimed in claim 5, wherein said first iconic information comprises a plurality of pieces of iconic information, which are successively stored in both said information display section and said information memory section.

7. The information display method as claimed in claim 5, wherein said first iconic information is displayed in accordance with the storing thereof in said information display section.

8. The information display method as claimed in claim 5, further comprising the step of making a choice as to whether or not repeating of said steps (1) to (3) should be performed.

9. The information recording method an claimed in claim 5, wherein said information memory section comprises at least one memory section selected from the group consisting of a magnetic memory section, an IC memory section, and a rewritable bar code section.

* * * * *